United States Patent
Buhler et al.

(10) Patent No.: US 10,227,876 B2
(45) Date of Patent: Mar. 12, 2019

(54) FILLET OPTIMIZATION FOR TURBINE AIRFOIL

(71) Applicant: General Electric Company, Schenectady, NY (US)

(72) Inventors: Jared Peter Buhler, Tewksbury, MA (US); Ronald Scott Bunker, West Chester, OH (US); Victor Hugo Silva Correia, Milton Mills, NH (US); Brian Kenneth Corsetti, Lynn, MA (US)

(73) Assignee: General Electric Company, Schenectady, NY (US)

(*) Notice: Subject to any disclaimer, the term of this patent is extended or adjusted under 35 U.S.C. 154(b) by 450 days.

(21) Appl. No.: 14/960,991

(22) Filed: Dec. 7, 2015

(65) Prior Publication Data
US 2017/0159450 A1   Jun. 8, 2017

(51) Int. Cl.
    F01D 5/18        (2006.01)
    F01D 5/20        (2006.01)

(52) U.S. Cl.
    CPC ............ F01D 5/186 (2013.01); F01D 5/20 (2013.01); *F05D 2220/32* (2013.01); *F05D 2240/307* (2013.01); *F05D 2260/202* (2013.01); *Y02T 50/671* (2013.01); *Y02T 50/676* (2013.01)

(58) Field of Classification Search
    CPC ... F01D 5/18; F01D 5/186; F01D 5/20; F01D 5/288; F01D 25/12; F05D 2240/307; F05D 2220/32; F05D 2260/202; Y02T 50/676; F02C 7/18
    See application file for complete search history.

(56) References Cited

U.S. PATENT DOCUMENTS

| 4,589,823 | A | * | 5/1986 | Koffel | F01D 5/20 415/173.4 |
| 5,261,789 | A |   | 11/1993 | Butts et al. | |
| 5,403,158 | A | * | 4/1995 | Auxier | F01D 5/20 415/173.1 |
| 5,688,104 | A |   | 11/1997 | Beabout | |

(Continued)

FOREIGN PATENT DOCUMENTS

| EP | 1 267 041 A2 | 12/2002 |
| EP | 1 270 873 A2 | 1/2003 |

(Continued)

OTHER PUBLICATIONS

Extended European Search Report and Opinion issued in connection with corresponding EP Application No. 16200948.4 dated Jul. 3, 2017.

*Primary Examiner* — Jason Shanske
*Assistant Examiner* — Topaz L Elliott
(74) *Attorney, Agent, or Firm* — General Electric Company; William Andes

(57) ABSTRACT

A blade for a gas turbine engine comprises an airfoil having a pressure side and a suction side, with a root and a tip wall. The pressure side and suction side extend beyond the tip wall to define a tip channel, defining a plurality of internal and external corners. The corners comprise fillets to define a thickness being greater than the thickness for the pressure, suction, or tip walls. A film hole can extend through the fillet, such that the length of the film hole at the fillet can be increased to define an increased length-to-diameter ratio for the film hole to improve film cooling through the film hole.

26 Claims, 12 Drawing Sheets

(56) References Cited

U.S. PATENT DOCUMENTS

| | | | |
|---|---|---|---|
| 5,738,491 A * | 4/1998 | Lee | F01D 5/147 415/177 |
| 6,494,678 B1 | 12/2002 | Bunker | |
| 6,602,052 B2 * | 8/2003 | Liang | F01D 5/18 416/224 |
| 7,118,342 B2 * | 10/2006 | Lee | F01D 5/186 416/97 R |
| 7,249,933 B2 | 7/2007 | Lee et al. | |
| 7,473,073 B1 | 1/2009 | Linag | |
| 7,510,376 B2 * | 3/2009 | Lee | F01D 5/20 416/97 R |
| 7,857,587 B2 * | 12/2010 | Correia | F01D 5/187 416/228 |
| 7,922,451 B1 * | 4/2011 | Liang | F01D 5/187 416/97 R |
| 7,997,865 B1 | 8/2011 | Liang | |
| 8,075,268 B1 | 12/2011 | Liang | |
| 8,469,666 B1 * | 6/2013 | Liang | F01D 5/187 415/115 |
| 8,545,180 B1 | 10/2013 | Liang | |
| 8,684,691 B2 * | 4/2014 | Lee | F01D 5/20 416/224 |
| 8,727,725 B1 | 5/2014 | Liang | |
| 8,777,567 B2 * | 7/2014 | Poon | F01D 5/20 416/92 |
| 9,156,114 B2 * | 10/2015 | Pal | B23H 9/14 |
| 9,630,277 B2 * | 4/2017 | Lee | B23P 6/007 |
| 2004/0094287 A1 | 5/2004 | Wang | |
| 2005/0232771 A1 | 10/2005 | Harvey et al. | |
| 2006/0051209 A1 | 3/2006 | Lee et al. | |
| 2008/0166240 A1 | 7/2008 | Scott et al. | |
| 2009/0208325 A1 | 8/2009 | Devore et al. | |
| 2010/0135813 A1 | 6/2010 | Marini et al. | |
| 2012/0070307 A1 | 3/2012 | Poon et al. | |
| 2012/0282108 A1 * | 11/2012 | Lee | F01D 5/20 416/97 R |
| 2013/0302179 A1 * | 11/2013 | Bergholz, Jr. | F01D 5/186 416/97 R |
| 2013/0312941 A1 | 11/2013 | Bunker | |
| 2014/0047842 A1 | 2/2014 | Chlus et al. | |
| 2017/0144252 A1 * | 5/2017 | Arjakine | B23P 6/007 |
| 2017/0145831 A1 | 5/2017 | Bunker | |
| 2017/0145921 A1 | 5/2017 | Bunker | |
| 2017/0159449 A1 | 6/2017 | Buhler et al. | |
| 2017/0159451 A1 | 6/2017 | Buhler et al. | |
| 2017/0159452 A1 | 6/2017 | Bunker et al. | |
| 2017/0167268 A1 | 6/2017 | Bunker | |

FOREIGN PATENT DOCUMENTS

| | | |
|---|---|---|
| EP | 1 422 383 A2 | 5/2004 |
| EP | 1 650 404 A2 | 4/2006 |
| EP | 1 762 701 A2 | 3/2007 |
| EP | 1 793 087 A1 | 6/2007 |
| EP | 2 378 076 A1 | 10/2011 |
| EP | 2685048 A1 | 1/2014 |

* cited by examiner

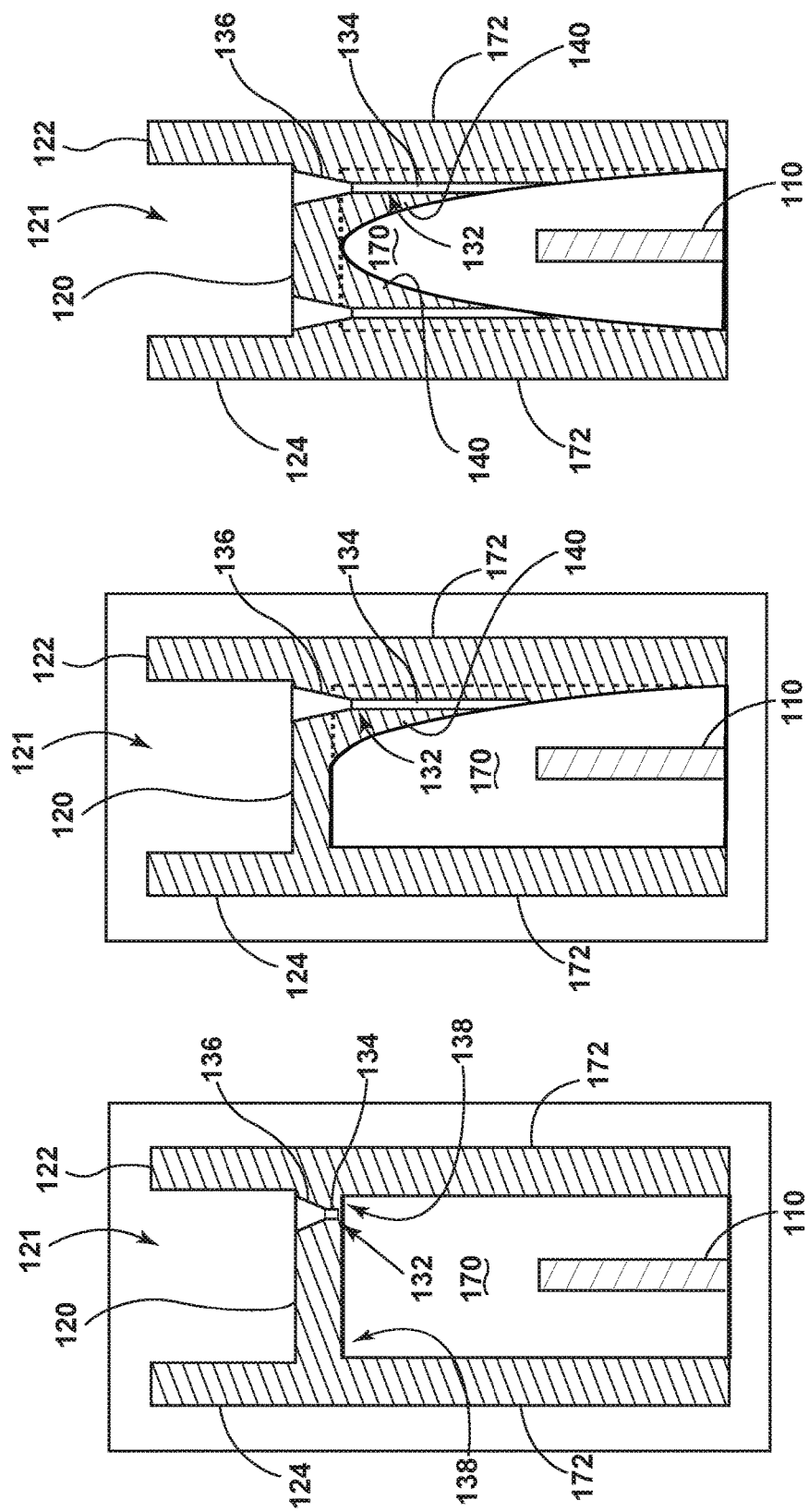

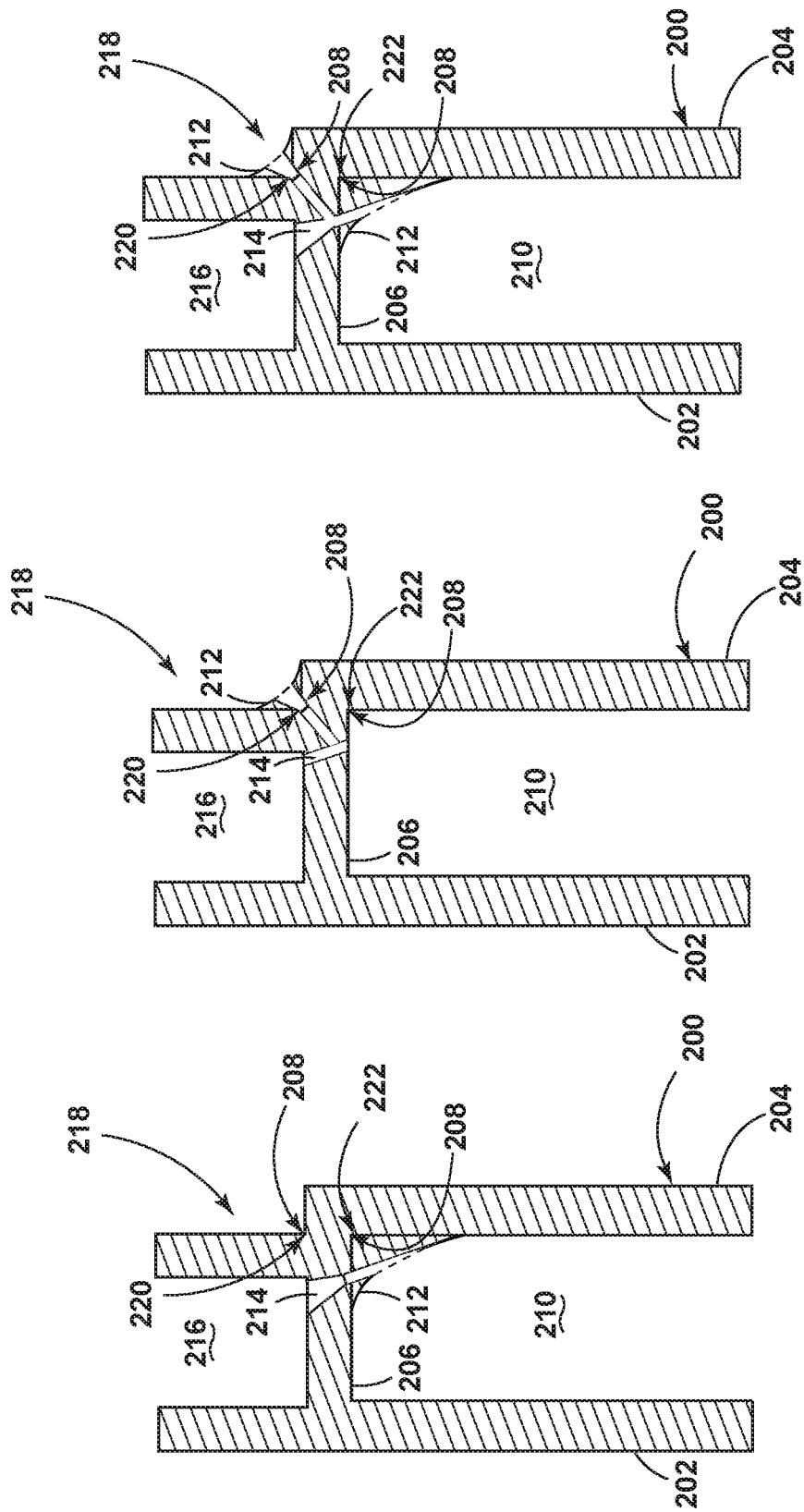

FILLET OPTIMIZATION FOR TURBINE AIRFOIL

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, a blade for a gas turbine engine comprising an airfoil having an outer wall defining a pressure side and a suction side, the outer wall extending chord-wise from a leading edge to a trailing edge and span-wise from a root toward a tip. The blade further comprises a tip channel spanning the pressure side and the suction side of the outer wall and intersecting the outer wall to form at least one corner, with the outer wall having a first thickness at the corner and the tip channel having a second thickness at the corner. The blade further has a cooling passage having a portion located along the tip channel and at least partially defined by the tip channel and the outer wall such that the corner defines a corner of the cooling passage. Further still, the blade comprises a fillet located at the corner having an effective radius of at least 1.5 times larger than the greater of the first and second thicknesses and at least one film hole extending through the fillet to fluidly couple the cooling passage to an exterior of the airfoil.

In another aspect, a method of forming a film holes in a blade of a gas turbine engine comprising forming the film hole through a fillet of a corner of a cooling passage formed by the intersection of a tip channel and an outer wall, with the fillet having an effective radius of at least 1.5 times greater than the greater of the thicknesses for the tip channel and the outer wall.

In another aspect, a blade for a gas turbine engine comprising an airfoil having an internal cooling passage at least partially formed by intersecting a tip channel and an outer wall defining a corner having a fillet with an effective radius of at least 1.5 times the thickness of the thickest of the intersecting tip channel and outer wall and at least one film holes extending through the fillet and at least one of the tip channel and outer wall.

BRIEF DESCRIPTION OF THE DRAWINGS

In the drawings:

FIGS. 9A-9C are cross-sectional views of section VIII of FIG. 4 illustrating the increased film hole length with an internal fillet within an internal serpentine circuit.

FIG. 11 is a cross-sectional view of an airfoil illustrating a film hole with an internal fillet having the film hole extending to the tip channel.

FIG. 12 is a cross-sectional view of an airfoil illustrating a film hole with an external fillet having the film hole extending to the tip channel and the tip shelf.

FIG. 13 is a cross-sectional view of an airfoil illustrating a film hole with an internal and external fillet having the film hole extending to the tip channel and the tip shelf.

DESCRIPTION OF EMBODIMENTS OF THE INVENTION

Figure 1:
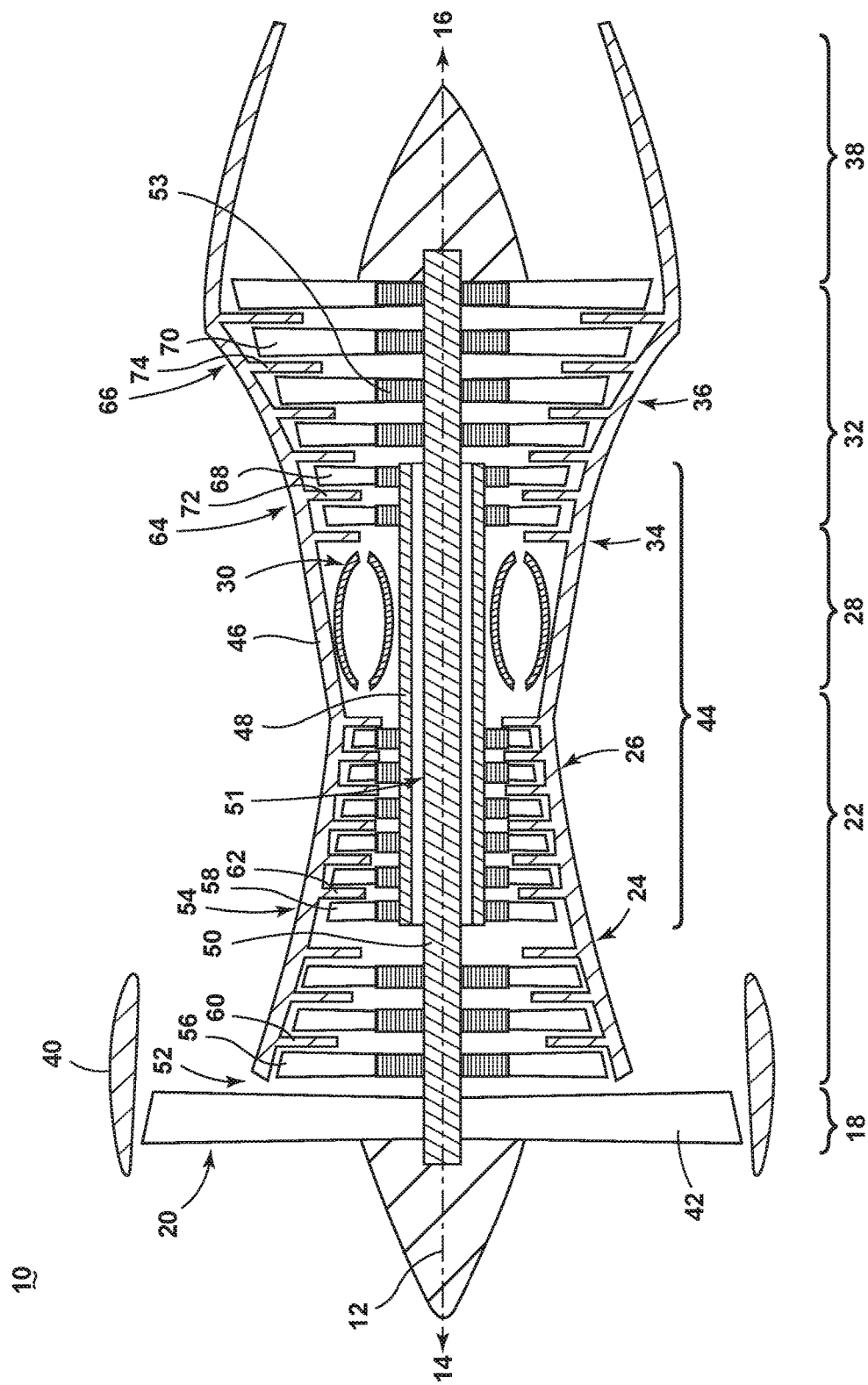
FIG. 1 is a schematic cross-sectional diagram of a gas turbine engine for an aircraft.

The described embodiments of the present invention are directed to apparatuses, methods, and other devices related to routing airflow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that for purposes of illustration, the present invention will be described with respect to an airfoil for a turbine blade of the turbine engine. It will be understood, however, that the invention is not limited to the turbine blade, and can comprise any airfoil structure, such as a compressor blade, a turbine or compressor vane, a fan blade, or a strut in non-limiting examples. Furthermore, the filleted optimization can have uses in additional engine components utilizing film holes or surface film cooling, such as a band, combustor assembly, or platform in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

It should be further understood that as used herein, the term 'fillet' is used to describe material that "fills" in a corner formed by a junction of two intersecting walls. It should be further understood that the intersecting walls can be integral and need not comprise separate intersecting elements. Similarly, the fillet can be integral with the intersecting walls. In the case of the fillet being integral to the intersecting walls, there is no clear demarcation between the fillet and the corner. In such a case, the fillet can be identified by virtually extending the wall thickness until the walls intersect to form a virtual corner.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
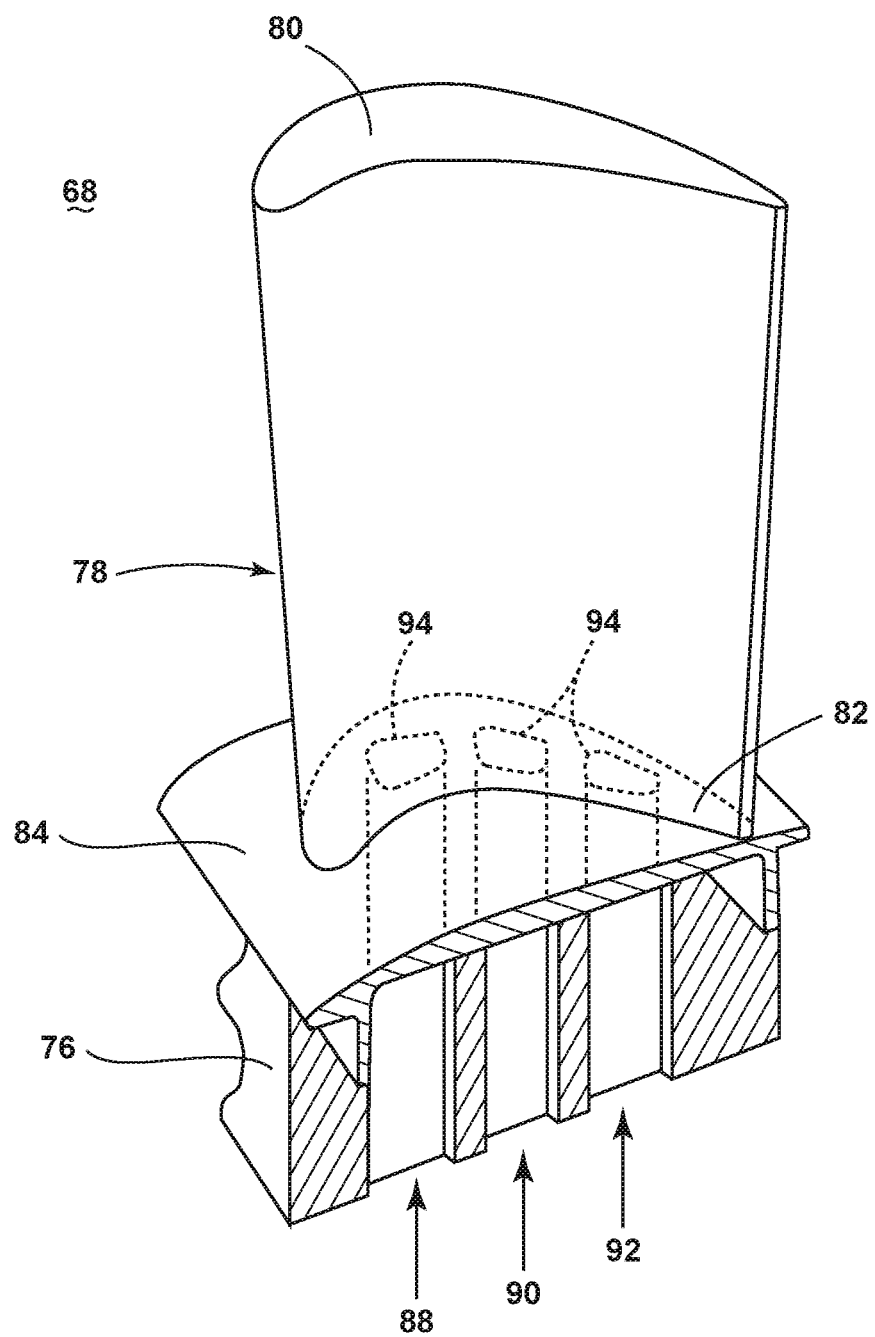
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 76 and an airfoil 78. The airfoil 78 extends from a tip 80 to a root 82. The dovetail 76 further includes a platform 84 integral with the airfoil 78 at the root 82, which helps to radially contain the turbine airflow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
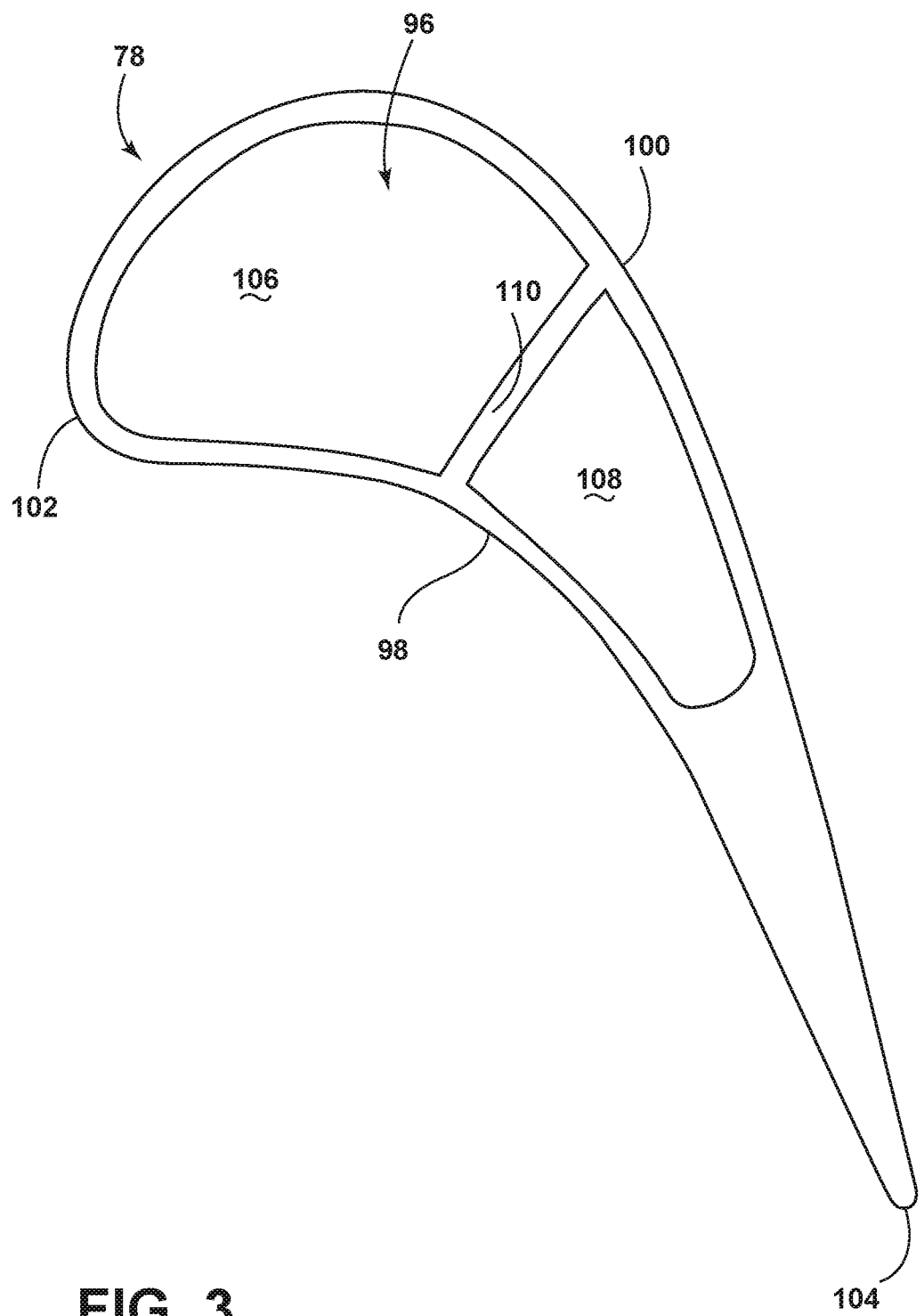
FIG. 3 is a cross-sectional view of the airfoil of FIG. 2.

Turning to FIG. 3, the airfoil 78, shown in cross-section, has a concave-shaped pressure sidewall 98 and a convex-shaped suction sidewall 100 which are joined together to define an airfoil shape with a leading edge 102 and a trailing edge 104. The airfoil 78 rotates in a direction such that the pressure sidewall 98 follows the suction sidewall 100. Thus, as shown in FIG. 3, the airfoil 78 would rotate upward toward the top of the page.

The airfoil 78 can comprise an interior 96 with a plurality of internal passages, illustrated by example as a first passage 106 and a second passage 108, separated by a rib 110, which can be arranged to form one or more cooling circuits dedicated to cool a particular portion of the airfoil 78. The passages 106, 108 can extend radially within the airfoil 78, from root-to-tip. It should be appreciated that the passages can comprise one or more film holes that can provide fluid communication between the particular passage and the external surface of the airfoil 78, providing a film of cooling fluid along the external surface of the airfoil 78.

Figure 4:
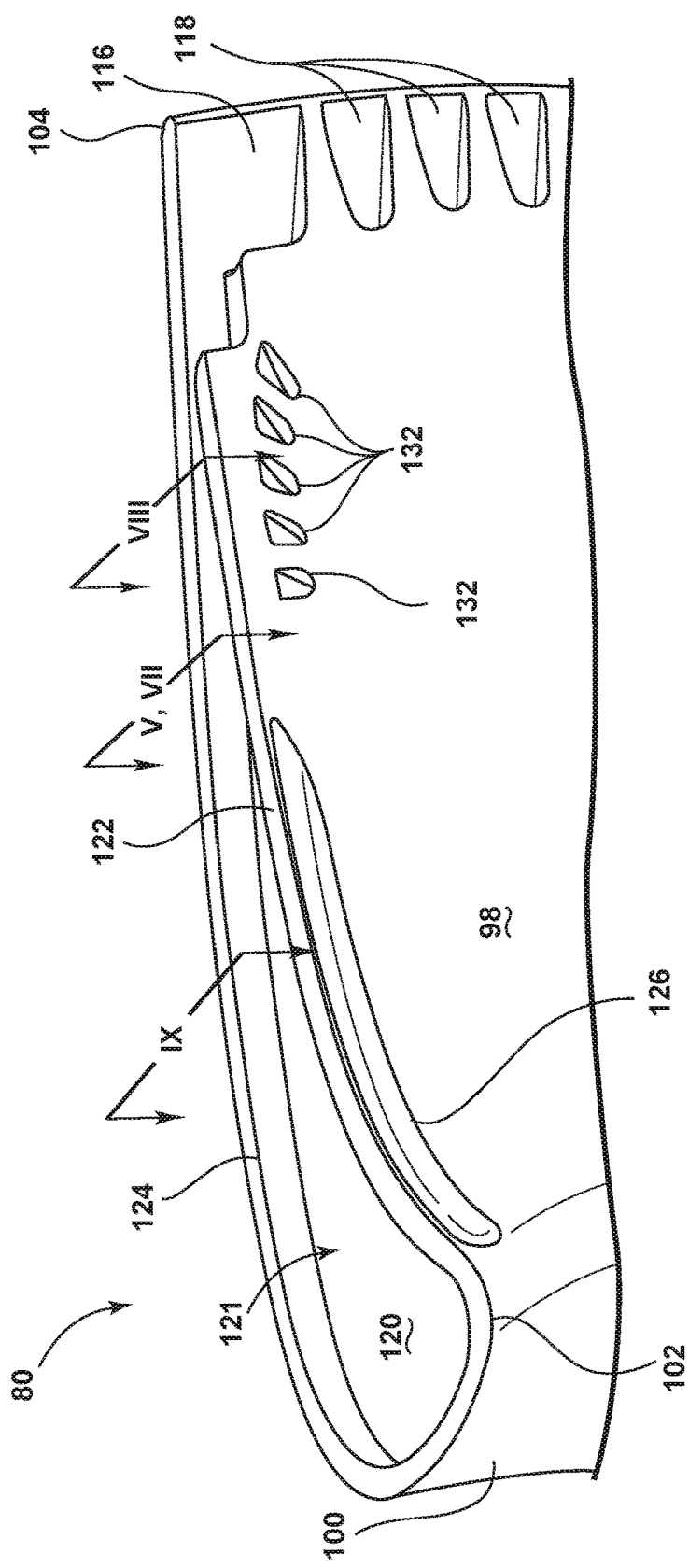
FIG. 4 is a perspective view of a tip of the airfoil of FIG. 2 illustrating a tip channel and a tip shelf.

In FIG. 4, a perspective view best illustrates the tip 80 of the airfoil 78. The pressure and suction sidewalls 98, 100 extend beyond the top surface of the tip 80 such that the top surface is defined as a tip wall 120 disposed between a pressure side extension 122 and a suction side extension 124. The combination of the tip wall 120, and the extensions 122, 124 can define a tip channel 121 disposed along the tip 80. A tip shelf 126 can be defined in the pressure side extension 122 as a groove located on the pressure sidewall 98. The airfoil 78 can further have one or more film holes 132 disposed therein, having the film holes 132 exemplarily illustrated on the pressure sidewall 98. Additionally, the airfoil 78 can have a plurality of exit apertures shown as slot channels 118 at the trailing edge 104, having a tip exit 116 disposed at the trailing edge adjacent the tip 80. Alternatively, a center extension (not shown) can extend from the tip wall 120 between the pressure and suction extensions 122, 124, dividing the tip channel 121 into separate tip channels.

Figure 5:
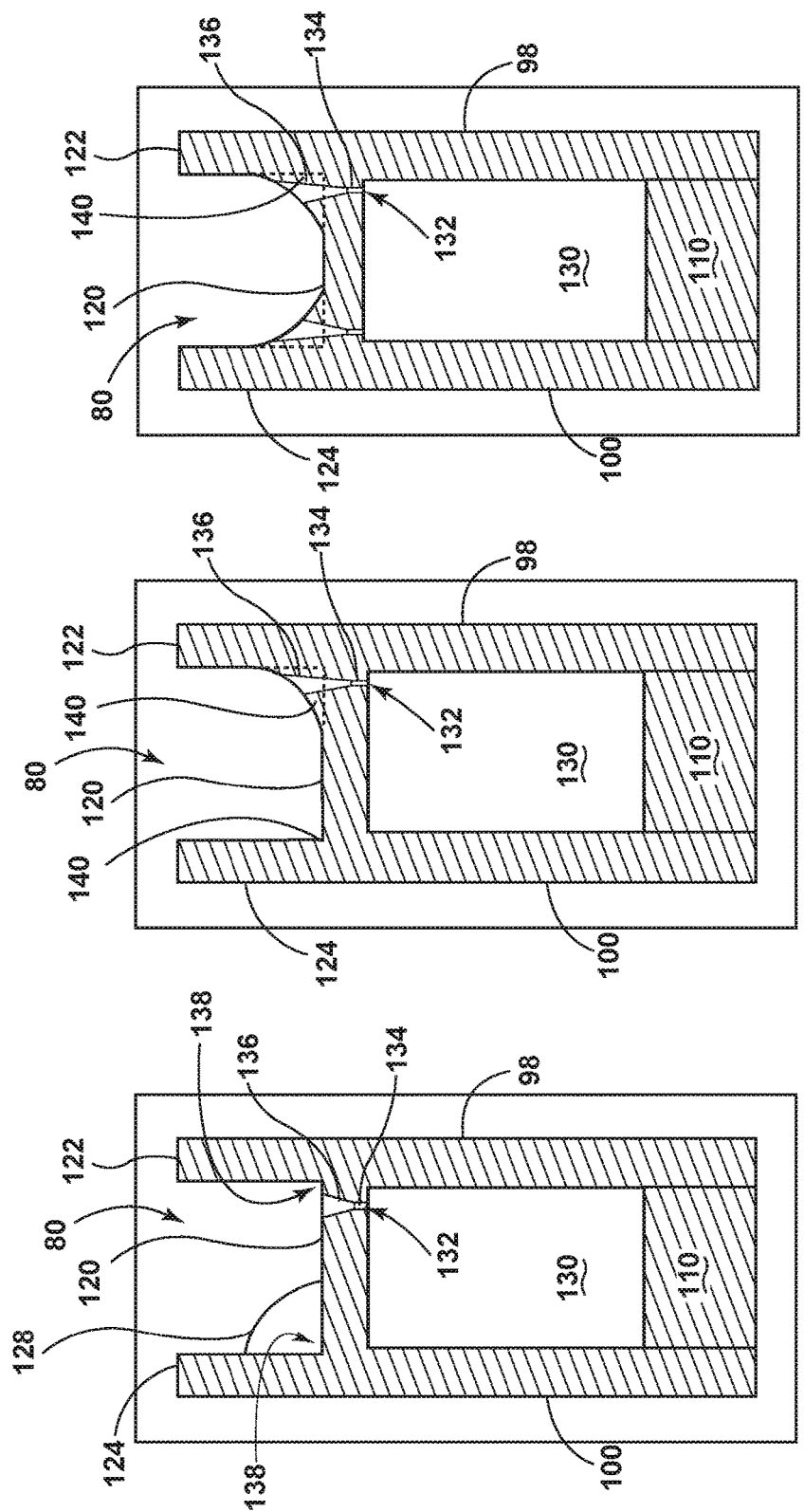
FIGS. 5A-5C are cross-sectional views of section V of FIG. 4 illustrating an increased film hole length by placing a fillet in the tip channel.

Turning now to FIGS. 5A-5C, a cross-sectional view taken along section V of FIG. 4 illustrates a cooling passage as a tip passage 130, which can comprise the first or second passages 106, 108 of FIG. 3. FIG. 5A is a prior art tip 80 for the airfoil 78 having a film hole 132 extending between the tip passage 130 and the exterior of the airfoil 78 at the tip wall 120. The tip passage 130 can have either a symmetrical or an asymmetrical cross-section. The film holes 132 can be a compound film hole, having a first portion 134 and a second portion 136, which can define a metering section and a diffusing section, respectively. The compound angle of the film holes can be defined as having both an axial component and a radial component relative to the engine centerline 12. Alternatively, the compound film hole can be defined as having a span-wise component and a chord-wise component, relative to the span and the chord of the airfoil 78. Thus, it can be understood that although the film holes 132 are shown in cross-section being substantially radial, i.e. orthogonal to the engine centerline 12, the film holes 132 can also extend in an axial direction relative to the engine centerline 12, or a combination of axial and radial. Furthermore, the film holes 132 can be non-linear, defining at least a portion of an arcuate profile. The film holes 132 are not restricted to being compound. They can be axial, radial, linear, angled, compound, arcuate or otherwise in non-limiting examples. Thus, a centerline of the film hole 132 can be straight, curved, arcuate, jointed, or otherwise.

A plurality of corners 138 can be defined at the junctions between the tip wall 120 and the pressure and suction wall extensions 122, 124. While the corners 138 are shown as sharp corners having a defined point, it should be appreciated that they are not so limited. For example, the corners 138 can be slightly rounded, or otherwise, such that a virtual corner can be defined. A corner angle 128 can be defined at each corner 138. The intersecting walls to define the corner 138 can intersect in a manner that defines an acute, right, or obtuse angle 128 for the corner 138. Additionally, one or more of the intersecting walls can be angled or arcuate, such that the corner 138 comprises an increasing cross-sectional distance extending from the corner 138 at the junction between the two walls.

Turning to FIG. 5B, the corner 138 adjacent the pressure side extension 122 and the tip wall 120 comprises a fillet 140. The fillet 140 defines an increased thickness at the corner 138 such that the length of the film hole 132 can be extended. In FIG. 5C, the fillets 140 can be disposed adjacent to either the pressure side extension 122, the suction side extension 124, or both. It should be further appreciated that nominally rounded corners are not equivalent to the fillets described herein. The fillets 140 define an increased thickness, while the slightly rounded corner can be nominal.

Figure 6:
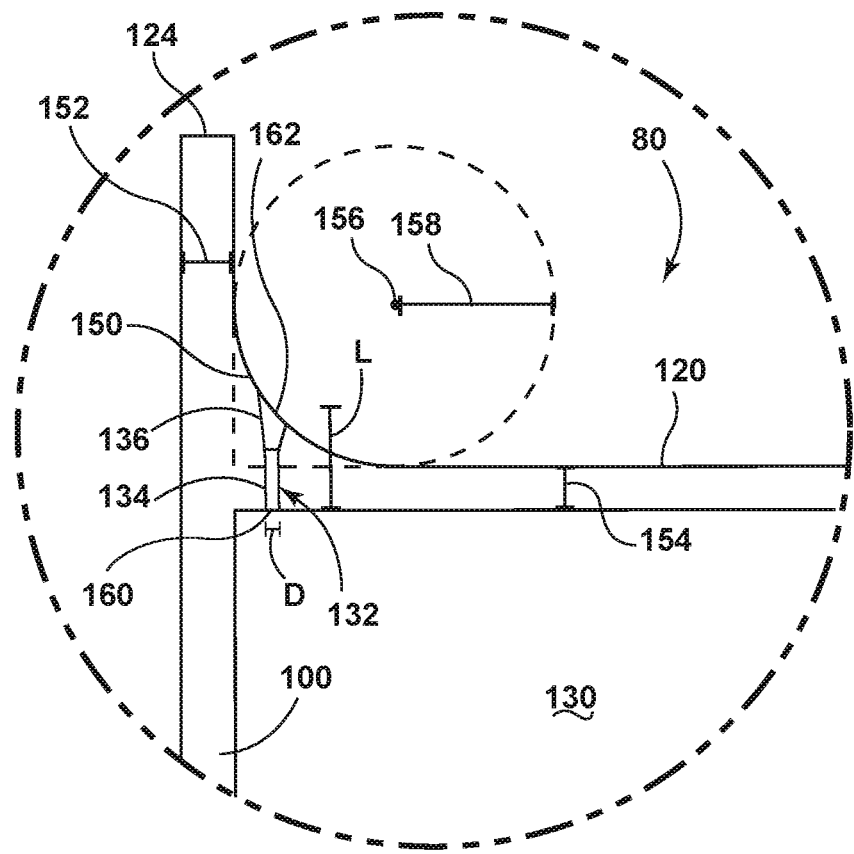
FIG. 6 is a schematic view illustrating the increased film hole length with an external fillet at the tip of the airfoil.

Turning now to FIG. 6, the fillet 140 as shown is exemplary and it should be understood that the fillets 140 are a material filling the corner 138 at the junction of intersecting walls, defining an increased thickness. The geometries as shown in FIG. 6 should be understood as exemplary, and should not be construed as limiting of the invention. Alternatively, the fillet 140 could be defined as a compound fillet, having discrete arcuate or linear surfaces defining the fillet 140.

A length L can be defined as the length between an inlet 160 and an outlet 162 of the film hole 132 and a diameter D can be defined as the cross-sectional width of the film hole 132. The length can be determined as the distance between the inlet 160 and the outlet 162 through the center of the film hole 132 where the centerline intersects the airfoil surface. As such, the film hole 132 can be defined by the length-to-diameter ratio, L/D. While the film holes 132 are illustrated as having an increasing cross-sectional area at the second portion 136, it should be understood that the film holes 132 can comprise a consistent diameter D and cross-sectional area. Alternatively, the centerline of the film hole 132 can be straight, curved, arcuate, jointed, and any other suitable shape in non-limiting examples.

The suction sidewall 100 and the suction sidewall extension 124 can have a thickness 152 defined as a width for the wall. Similarly, the tip wall 120 can have a thickness 154. The increased thickness of the fillet 140 can be defined against the virtual extensions of the walls 120, 124, shown in dashed line, such that the extensions 120, 124 at the fillet 140 have an increased thickness being greater than the thicknesses 152, 154 of the respective walls 120, 124. It should be understood that the fillets 140 need not comprise additional material, but can be integral with at least one of the walls 120, 124 and can define a thickness against the virtual extensions of the walls 120, 124 shown in dashed lines adjacent the fillet 140. It should be further appreciated that the virtual extensions of the walls are for illustrative purposes, providing the reader with a means of visual comparison of the thickness of the fillet 140 against the wall thicknesses 120, 124, and such an extension of the walls adjacent the fillet 140 are not required.

The fillet 140 can define at least a portion of a circle or an arcuate surface 150, such that an effective radius 158 is defined between the fillet 140 and a center point 156 of the arcuate surface 150. The fillet 140 comprises a thickness extending between the corner 138, shown in dashed line, and the arcuate surface 150. The fillet 140 is shaped such that the effective radius 158 is at least 1.5 times larger than the greater of the first or second thickness 152, 154. Alternatively, the shape and size of the fillet 140 can adapted to increase the length of the film holes 132. Increasing the length L of the film holes 132 increases the value for the L/D ratio for the film holes 132. Furthermore, the angle 128 (FIG. 5A) defined by the corner 138 can provide for an increased or decreased effective radius 158. For example, the filleted corner 138, as illustrated, is a right angle providing for an effective radius 158 of approximately 2.0-2.5 times the larger of the thicknesses 152, 154. In alternative corners 138 where the angle 128 is acute or obtuse, for example, the fillet 140 can define an effective radius, which can be greater or smaller than the exemplary embodiment shown. As such, the fillet 140 can define an effective radius of 1.5 to 10.0 times the thicknesses 152, 154, or more. It should be understood, however, that the thickness defined by the fillet 140 is not limited to being defined by the angle 128 of the intersecting walls 120, 124.

While the thicknesses 152, 154 are shown in reference to the tip wall 120 and the suction sidewall extension 124, it should be appreciated that the respective geometries of the tip passage 130 within the airfoil 78 as shown is exemplary and should not limit the airfoil 78 to the geometries, dimensions, proportions, or positions as shown. The fillet 140 can be defined in additional places at the tip 80 of the airfoil 78 and will be fully described in the examples shown in FIGS. 7-10.

It should be further appreciated that the circle shape defined by the fillet 140 is exemplary. The fillet 140 need not be shaped such that fillet 140 defines the circle shape. The fillet 140 can be any arcuate shape or segment thereof, such that a radius or local radius can define the effective radius 158. The fillet 140 can be a non-circular arc, such that a segment of the arc or at least a portion of the fillet 140 can define a local radius to comprise the effective radius 158. Alternatively, the fillet 140 could be defined as a compound fillet with a compound radius of curvature, having discrete arcuate or linear surfaces defining the fillet 140. When utilizing a compound radius of curvature defined by the fillet 140, the average overall radius could be used to determine the effective radius 158. Further still, the fillets 140 accommodate film hole inlet or exit shaping, as well as non-linear geometries. As such, exit shaping should be understood as any shape other than a standard round inlet or exit.

Figures 7A, 7B, 7C:
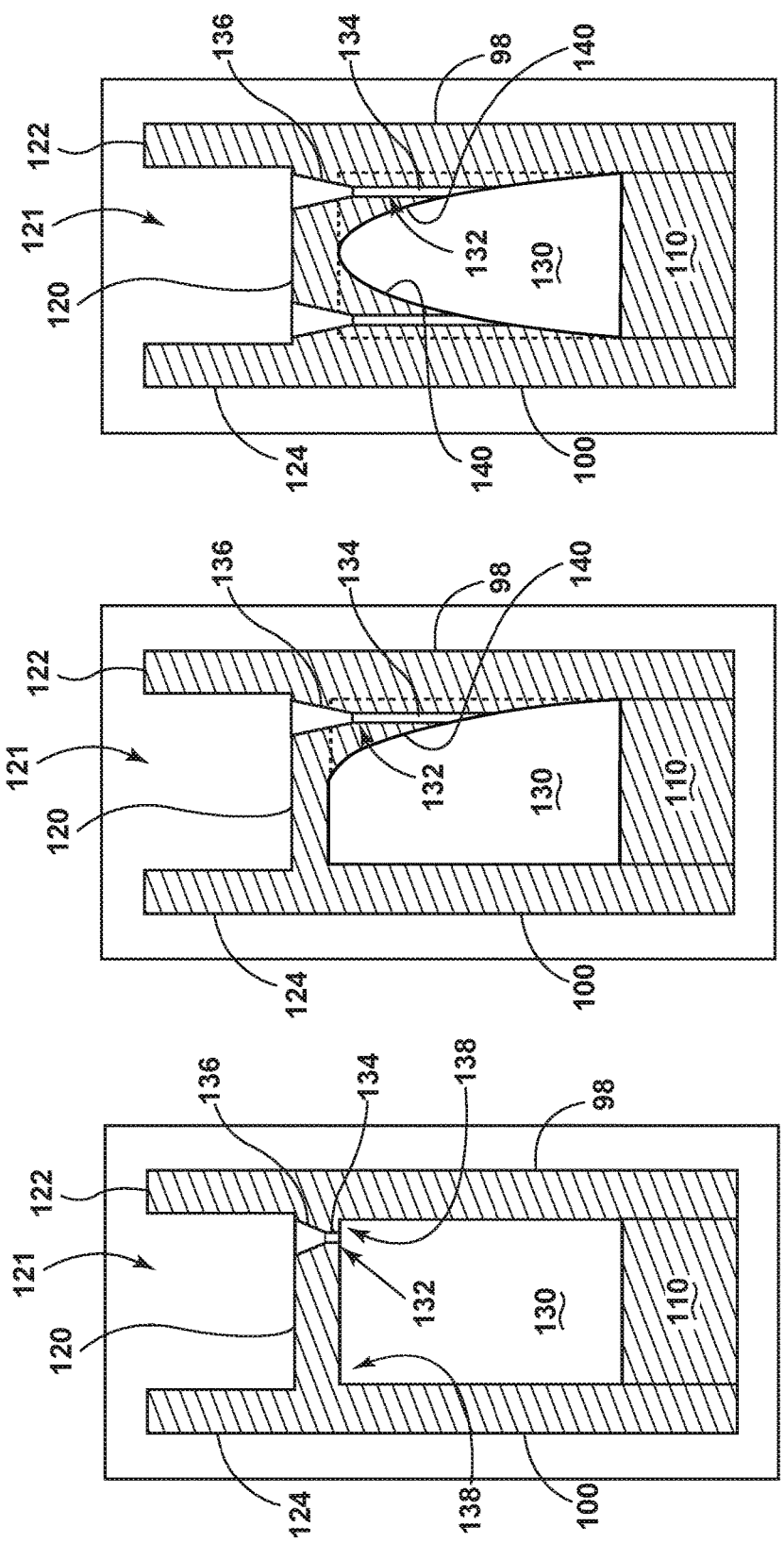
FIGS. 7A-7C are cross-sectional views of section VII of FIG. 4 illustrating the increased film hole length by placing a fillet internal of the airfoil adjacent to the tip channel.

Turning now to FIGS. 7A-9B, multiple examples for implementation of a fillet 140 near the tip 80 are shown. In FIGS. 7A-7C, the fillet 140 can be disposed within the tip passage 130 of the airfoil, illustrating the cross-section VII of FIG. 4. Looking at FIG. 7A, showing a prior art blade tip, the corners 138 can be defined internal of the airfoil 78, adjacent to the tip wall 120 and the pressure and suction sidewalls 98, 100. In FIG. 7B, the fillet 140 is disposed adjacent to the pressure sidewall 98, providing for an increased length for the film hole 132, such that the L/D ratio defined by the film hole 132 can be increased. FIG. 7C shows an additional exemplary embodiment having a fillet 140 adjacent to both the pressure and suction sidewalls 98, 100. Thus, it should be understood that the fillet can be disposed adjacent to the pressure sidewall 98, the suction sidewall 100, or both.

Figure 8C:
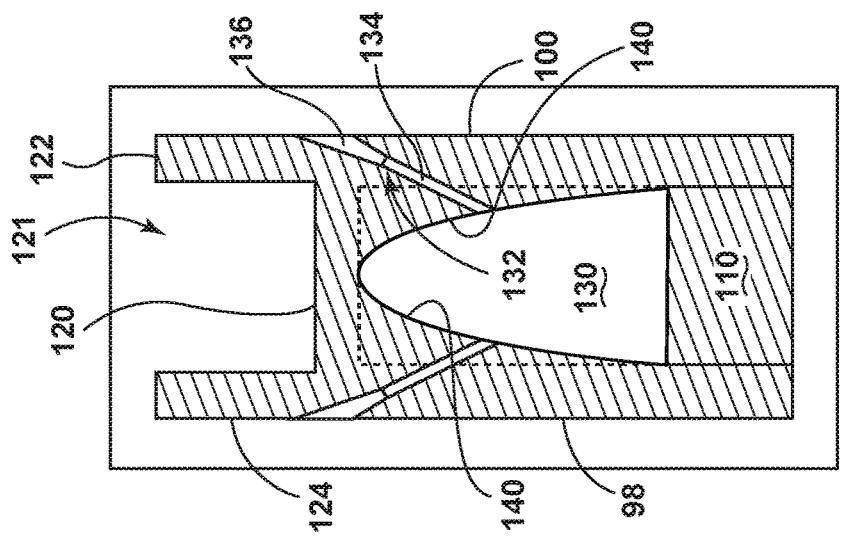
FIGS. 8A-8C are cross-sectional views of section VIII of FIG. 4 illustrating the increased film hole length with an internal fillet having the film hole extending to a sidewall.
Figure 8B:
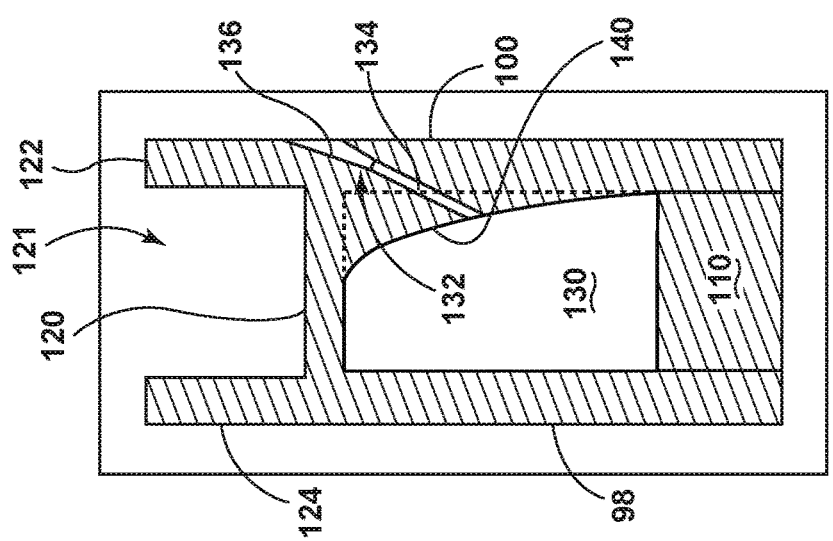
Figure 8A:
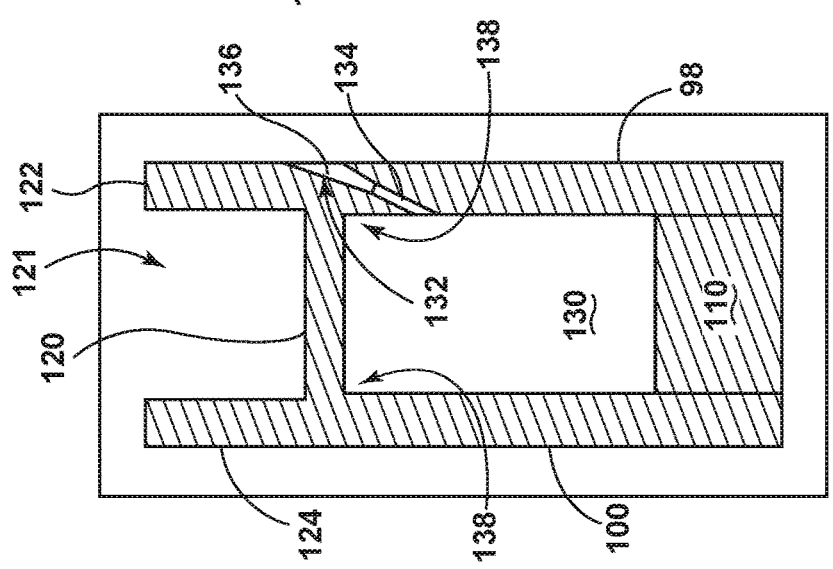

Turning now to FIGS. 8A-8C, the tip 80 of the airfoil can be defined by section VIII of FIG. 4, having film holes 132 extending from the tip passage 130 to the pressure sidewall 98 of the airfoil 78. In FIG. 8A illustrating a prior art blade tip, similar to FIG. 7A, the corners 138 are defined adjacent to the tip wall 120 and the pressure and suction sidewalls 98, 100. The film hole 132 extends through the pressure sidewall 98 providing fluid communication between the tip passage 130 and the side of the airfoil 78.

In FIG. 8B, the corner 138 adjacent to the pressure sidewall 98 comprises the fillet 140, providing for an increased L/D ratio for the film hole 132 extending to the external surface of the pressure sidewall 98. In FIG. 8C, another example illustrates the potential to have both a film hole 132 disposed on the pressure and suction sidewalls 98, 100. Thus, it should be understood that the film hole 132 can be disposed through the fillet 140 to either the pressure sidewall 98, the suction sidewall 100, or both.

Turning now to FIGS. 9A-9C, another example illustrates fillets 140 being disposed within a serpentine section of an internal cooling circuit. Looking at FIG. 9A, showing a prior art turn 170 of a cooling circuit as the tip passage, the corners 138 can be defined at the junction between the tip wall 120 and one or more internal ribs 172, extending along the radial, span-wise length of the airfoil 78. Turning to FIGS. 9B and 9C, the fillets 140 can be placed at the corners defined against the internal ribs 172 at the tip wall 120. The fillets 140 can be utilized to increase the length of the film holes 132 defining a greater L/D ratio for the film holes to increase film cooling effectiveness at the tip 80.

Figure 10B:
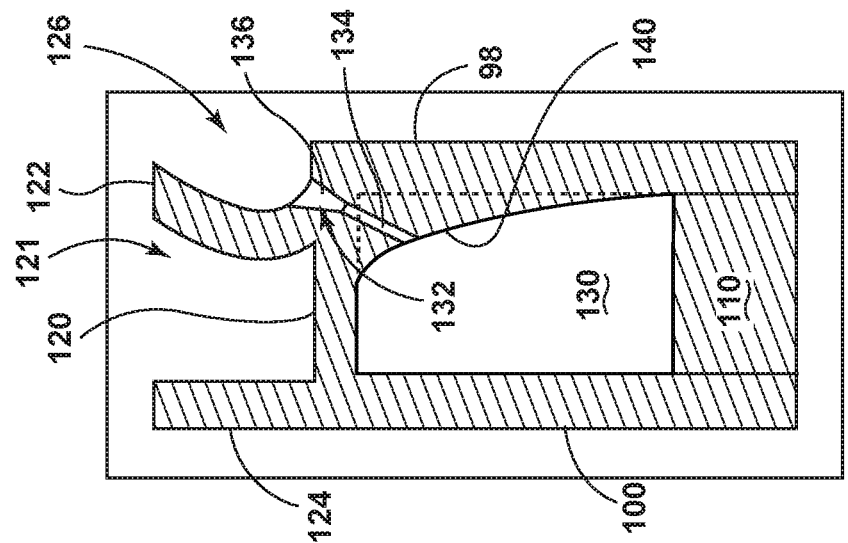
FIGS. 10A-10B are cross-sectional views of section IX of FIG. 4 illustrating the increased film hole length with an internal fillet having the film hole extending to a tip shelf.
Figure 10A:
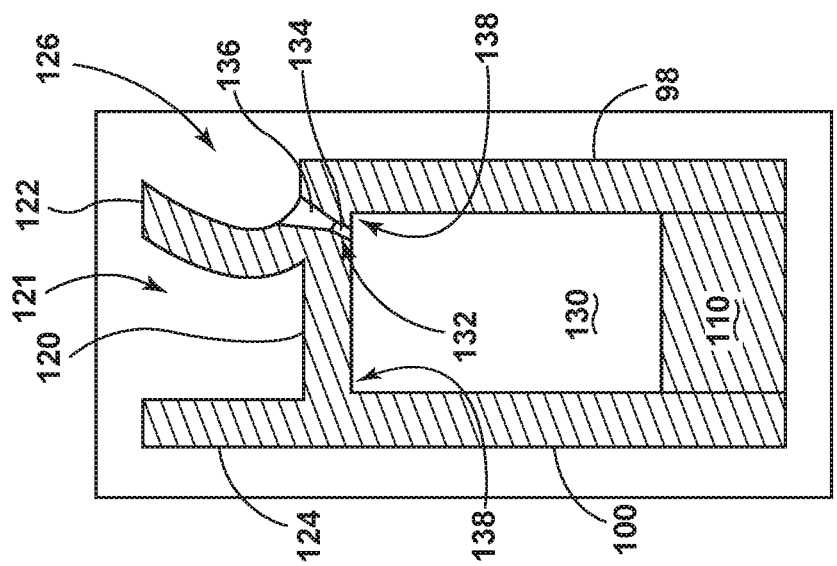

Turning to FIGS. 10A-10B, taken at the section IX of FIG. 4, the tip 80 of the airfoil 78 with the tip shelf 126 disposed in the pressure sidewall 98. In FIG. 10A, similar to FIGS. 7 and 8, the corners can be disposed within the tip passage 130 adjacent to the tip wall 120 and the pressure and suction sidewalls 98, 100. The film hole 132 is disposed in the tip wall 120 and extends to the tip shelf 126. In FIG. 10B, the corner 138 adjacent to the pressure sidewall 98 at the tip shelf 126 can comprise a fillet 140, providing for an increased L/D ratio for the film hole 132 extending to the tip shelf 126. Alternatively, it is contemplated that the fillet 140 can be between the tip wall 120 and the side extension 122 at the tip shelf 126, being external of the airfoil and located within the tip channel 121.

Figure 14:
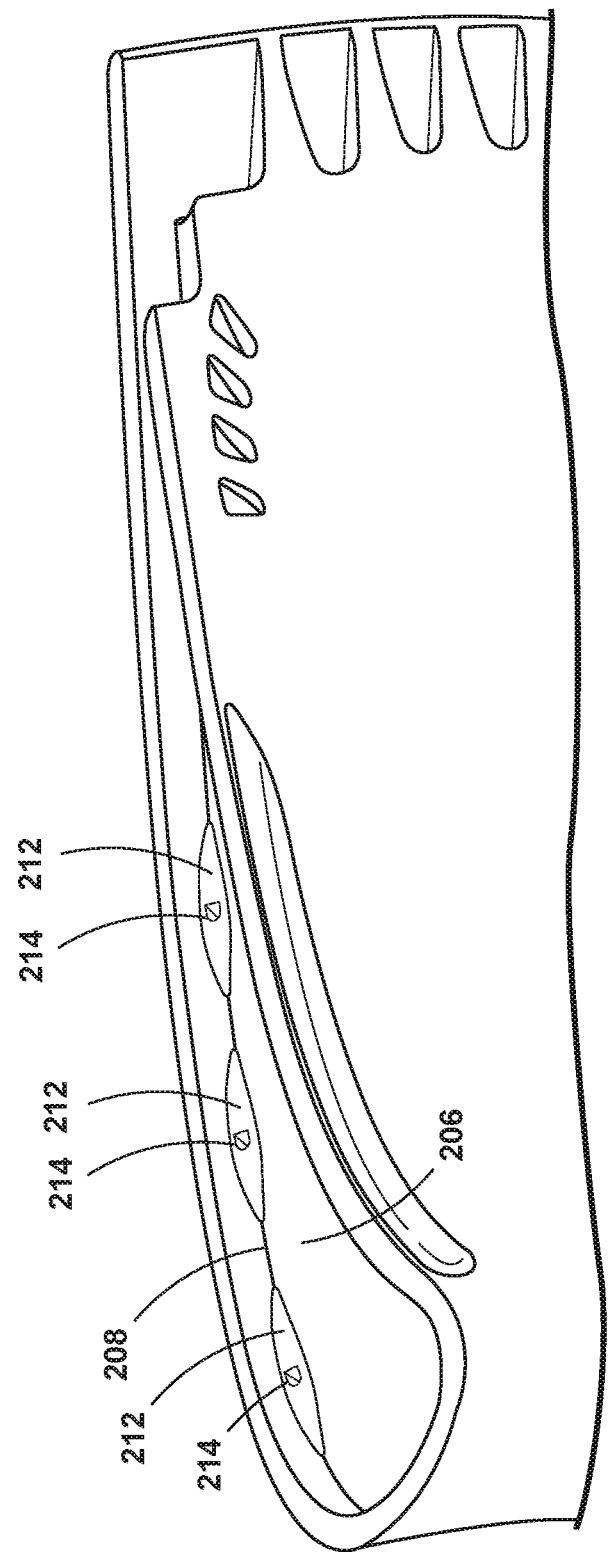
FIG. 14 is a perspective view of a tip of an airfoil illustrating a discontinuous fillet.

The film hole 132 at the tip shelf 126 can be a shaped film hole or comprise a compound film hole as described herein. The film hole 132 can be disposed on any surface of the tip shelf 126, such as a fillet, bottom shelf surface, radial face, or any combination thereof. Additionally, the film hole 132 can have any orientation, being radial, axial, tangential, or any combination thereof. The film hole 132 can extend from the filleted surface 140 to the tip shelf 126 or from the tip wall 120 through a portion of the filleted surface 140, being interior of or exterior of the airfoil, to the tip shelf 126. The fillet 140 provides for an increased length for the film hole 132, defining a greater L/D ration for the film hole 132 to improve film effectiveness. Referring now to FIGS. 11-13, a blade for a gas turbine engine can include an airfoil having an outer wall 200 defining a pressure side 202 and suction side 204, the outer wall 200 extending chord-wise from a leading edge to a trailing edge and span-wise from a root toward a tip. A tip wall 206 spanning the pressure side 202 and the suction side 204 of the outer wall 200 and intersecting the outer wall 200 forms at least one corner 208. The outer wall 200 has a first thickness at the corner 208 and the tip wall 206 has a second thickness at the corner 208. A cooling passage 210 has a portion located along the tip wall 206 and is at least partially defined by the tip wall 206 and the outer wall 200. A fillet 212 is located at the corner 208 and has an effective radius of at least 1.5 times larger than the greater of the first and second thicknesses; and at least one film hole 214 extending through the fillet 212 to fluidly couple the cooling passage 210 to an exterior of the airfoil. The tip wall 206 includes a tip channel 216 and the at least one film hole 214 extends to the tip channel 216. Referring specifically to FIGS. 11 and 12, a tip shelf 218 is disposed within the outer wall 200 wherein the outer wall 200 extends beyond the tip wall 206 to define an external corner 220 at the tip shelf 218 and an internal corner 222 at the tip wall 206, one of which defines the corner 208. Referring specifically to FIG. 13, the fillet 212 is located at both of the external and internal corners 220, 222, with the at least one film hole 214 passing through both fillets 212. Furthermore, referring now to FIG. 14, the corner 208 can extend chord-wise along the tip wall 206 and the fillet 212 extends chord-wise along the corner 208, at the at least one film hole 214 comprises multiple film holes 214. The fillet 212 can be discontinuous.

It should be appreciated that as described herein, the filleted surfaces, being internal or external, increase the length for the film holes and the L/D values for film holes by locally increasing both the internal and external fillet radius through which the hole penetrates. The increased values for L/D provide for increased cooling film hole effectiveness. The fillets can minimally increase overall system weight without thickening an entire wall or surface. Furthermore, the fillets provide for an increase in structural support. Further still, the fillets accommodate film hole inlet or exit shaping, as well as non-linear geometries. As such, exit shaping should be understood as any shape other than a standard round inlet or exit. Additionally, as described herein, any fillets can be used in combination with one another, such that two fillets are used to increase the L/D ratio for film holes extending through the fillets.

The film holes can be in a wall surface or a fillet surface and penetrate through at least a portion of the fillet, permitting an increased length for the film hole otherwise impossible to achieve without the fillet. Furthermore, the fillets can be compounded, such as filleted internal surfaces or the combination in external and internal surfaces to further increase the length to achieve greater L/D values.

It should be further appreciated that the fillets provide for an increased length providing the potential for a wider range of film holes, such as curved film holes, "S-curved" film holes as well as other orientations beyond a standard straight or compound film hole with increased effectiveness.

It should be further understood that while the embodiments as described herein relate to an airfoil, the filleted corners can be utilized in additional engine components having intersecting walls to define a corner and utilizing film holes or cooling at or near those corners of the engine components.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blade for a gas turbine engine comprising:
   an airfoil having an outer wall defining a pressure side and a suction side, the outer wall extending chord-wise from a leading edge to a trailing edge and span-wise from a root toward a tip;
   a tip wall spanning the pressure side and the suction side of the outer wall and intersecting the outer wall to form at least one corner and defining a tip channel, with the outer wall having a first thickness at the at least one corner and the tip wall having a second thickness at the at least one corner;
   a cooling passage having a portion located along the tip wall and at least partially defined by the tip wall and the outer wall;
   a tip shelf disposed within the outer wall wherein the outer wall extends beyond the tip wall to define an external corner at the tip shelf and an internal corner at the tip wall, one of the external corner or the internal corner defining the at least one corner
   a fillet located at the at least one corner and having an effective radius of at least 1.5 times larger than the greater of the first and second thicknesses; and
   at least one film hole extending through the fillet to fluidly couple the cooling passage to an exterior of the airfoil in the tip channel.

2. The blade according to claim 1 wherein the at least one film hole extends through at least one of the pressure side and the suction side.

3. The blade according to claim 1 wherein the fillet is located at both of the external and internal corners, with the at least one film hole passing through both fillets.

4. The blade according to claim 1 wherein the at least one corner extends chord-wise along the tip wall, the fillet extends chord-wise along the at least one corner, and the at least one film hole comprises multiple film holes.

5. The blade according to claim 4 wherein the fillet is continuous.

6. The blade according to claim 1 wherein the effective radius is at least 2.0 times larger than the greater of the first and second thicknesses.

7. The blade according to claim 1 wherein the effective radius is at least 4.0 times larger than the greater of the first and second thicknesses.

8. The blade according to claim 7 wherein the effective radius is less than 10.0 times larger than the greatest of the first and second thicknesses.

9. The blade according to claim 8 wherein the fillet further comprises an arcuate surface defined by the fillet and wherein the arcuate surface determines the effective radius.

10. The blade according to claim 1 wherein the cooling passage has one to three corners.

11. The blade according to claim 1 wherein the cooling passage has one to two corners.

12. The blade according to claim 1 wherein the cooling passage has a symmetrical cross section.

13. The blade according to claim 1 wherein the cooling passage has an asymmetrical cross section.

14. The blade according to claim 1 wherein the at least one film hole is linear.

15. The blade according to claim 1 wherein the at least one film hole is non-linear.

16. The blade according to claim 1 wherein the fillet is external to the airfoil.

17. The blade according to claim 1 wherein the fillet is internal to the airfoil.

18. The blade according to claim 1 wherein the at least one film hole defines a centerline forming a compound angle.

19. The blade according to claim 18 wherein the compound angle comprises both a span-wise component and a chord-wise component.

20. The blade according to claim 19 wherein the at least one film hole is non-linear.

21. The blade according to claim 20 wherein the at least one film hole is curvilinear.

22. A blade for a gas turbine engine comprising an airfoil having an internal cooling passage at least partially formed by intersecting a tip wall and an outer wall defining a corner having a fillet with an effective radius of at least 1.5 times a thickness of the thicker of the intersecting tip wall and outer wall and at least one film hole extending through the fillet and at least one of the tip wall and outer wall.

23. The blade according to claim 22 wherein the effective radius is greater than 2.0 times the thickness of the thicker of the tip wall and outer wall.

24. The blade according to claim 23 wherein the effective radius is at least 4.0 times larger than the greatest of the thicknesses.

25. The blade according to claim 23 wherein the effective radius is less than 10.0 times the thickness of the thicker of the tip wall and outer wall.

26. A blade for a gas turbine engine comprising:
an airfoil having an outer wall defining a pressure side and a suction side, the outer wall extending chord-wise from a leading edge to a trailing edge and span-wise from a root toward a tip;
a tip wall spanning the pressure side and the suction side of the outer wall and intersecting the outer wall to form at least one corner with a fillet, with the outer wall having a first thickness at the filleted corner and the tip wall having a second thickness at the at least one filleted corner, the fillet having an effective radius of at least 1.5 times larger than the greater of the first and second thicknesses;
a cooling passage having a portion located along the tip wall and at least partially defined by the tip wall and the outer wall; and
at least one film hole extending through the fillet to fluidly couple the cooling passage to an exterior of the airfoil;
wherein the at least one filleted corner extends chord-wise along the tip wall and the fillet extends chord-wise along the at least one filleted corner; and
wherein the fillet is discontinuous and the at least one film hole comprises multiple film holes.

* * * * *